United States Patent [19]
Rinker

[11] 3,841,445
[45] Oct. 15, 1974

[54] HOLD-DOWN ASSEMBLY FOR SLIDING CALIPER TYPE DISK BRAKE

[75] Inventor: Kurt H. Rinker, Plymouth, Mich.

[73] Assignee: Kelsey-Hayes Company, Romulus, Mich.

[22] Filed: Aug. 11, 1972

[21] Appl. No.: 280,079

[52] U.S. Cl. .............................................. 188/73.5
[51] Int. Cl. ............................................ F16d 65/02
[58] Field of Search ..... 188/73.5, 72.3, 73.3, 205 A

[56] References Cited
UNITED STATES PATENTS

| | | | |
|---|---|---|---|
| 3,403,756 | 10/1968 | Thirion | 188/73.3 |
| 3,612,226 | 10/1971 | Pauwels | 188/73.3 |
| 3,612,227 | 10/1971 | Schaftner et al. | 188/73.6 X |
| 3,625,314 | 12/1971 | Rinker | 188/73.5 X |
| 3,710,896 | 1/1973 | Machek | 188/73.5 |

FOREIGN PATENTS OR APPLICATIONS
1,373,760  8/1964  France .............................. 188/73.3

*Primary Examiner*—George E. A. Halvosa
*Attorney, Agent, or Firm*—Harness, Dickey & Pierce

[57] ABSTRACT

Several embodiments of hold-down spring arrangements for sliding caliper type disk brake assemblies. In each embodiment, the hold-down includes a plate that is adapted to be affixed to the torque taking member of the brake and a cooperating formed spring that is retained by the plate and which engages the sliding caliper. The spring permits sliding movement of the caliper but holds the caliper against vibration and rattling. In one embodiment the spring is of the leaf type and in the other embodiments the spring is constructed from a formed wire element and functions as a torsional type spring.

4 Claims, 12 Drawing Figures

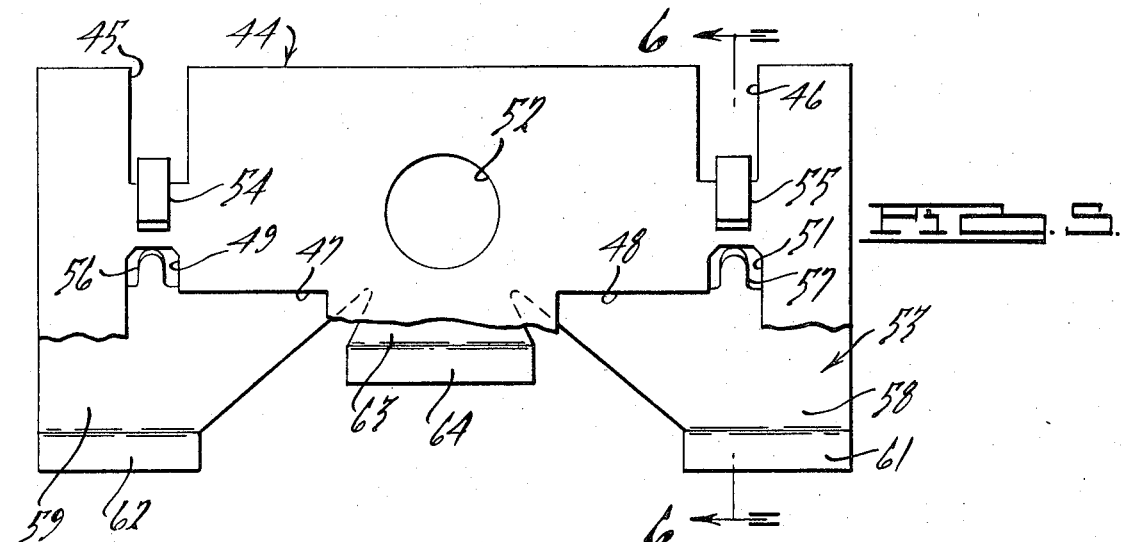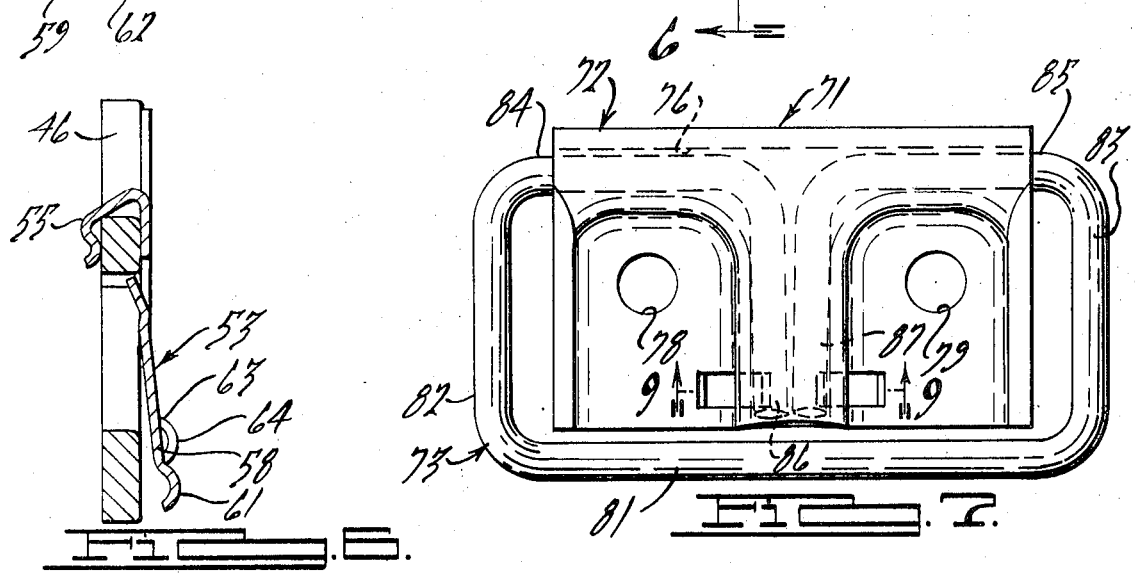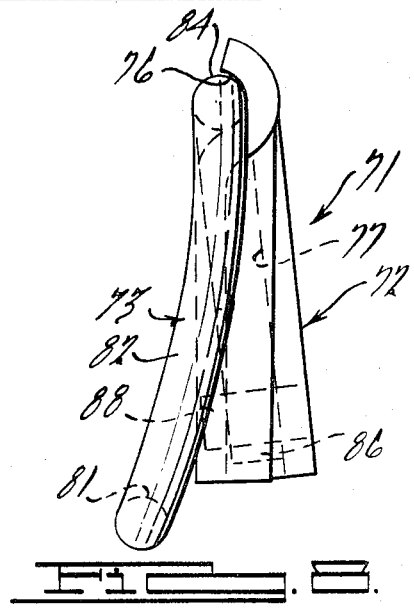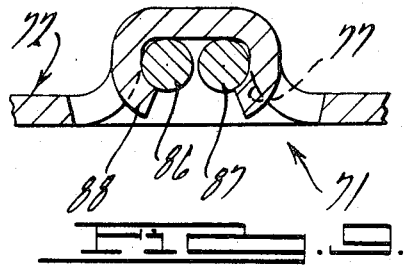

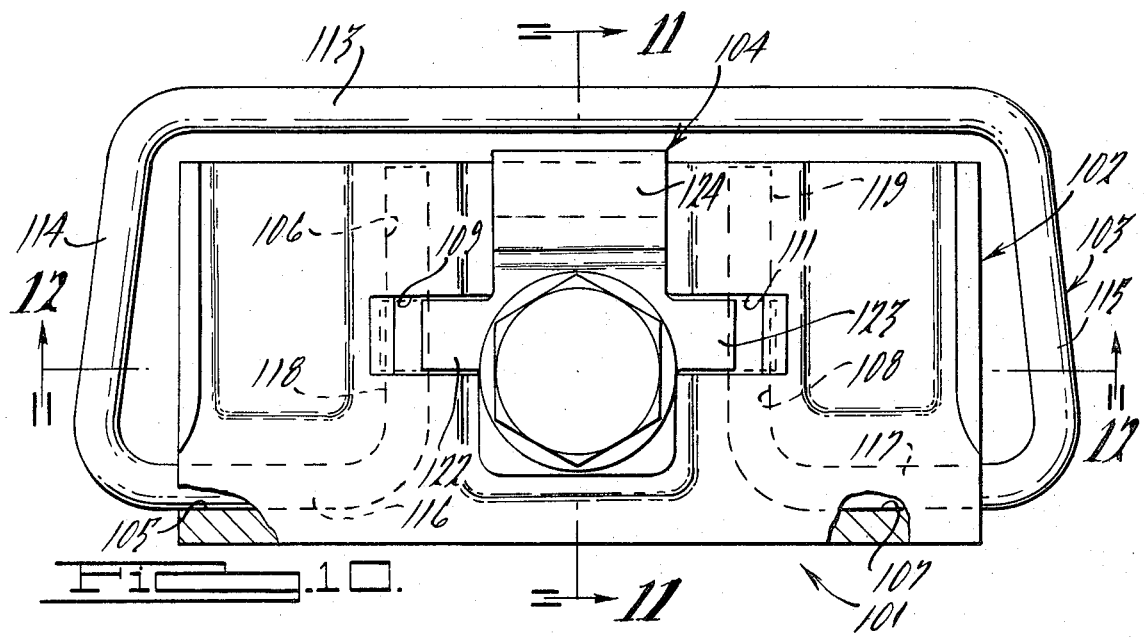
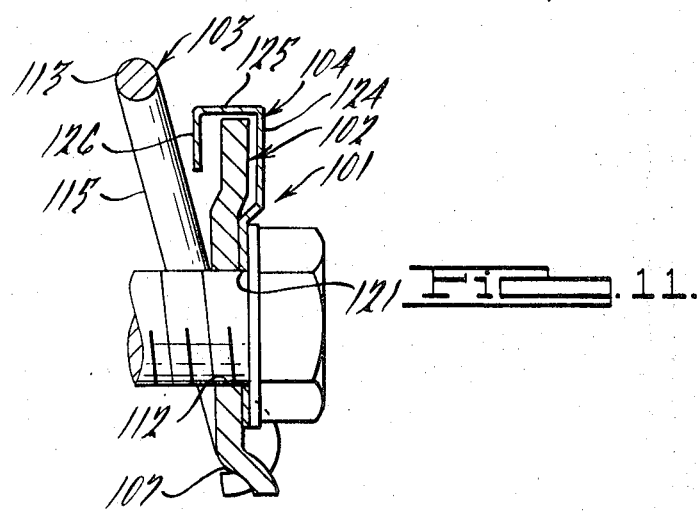
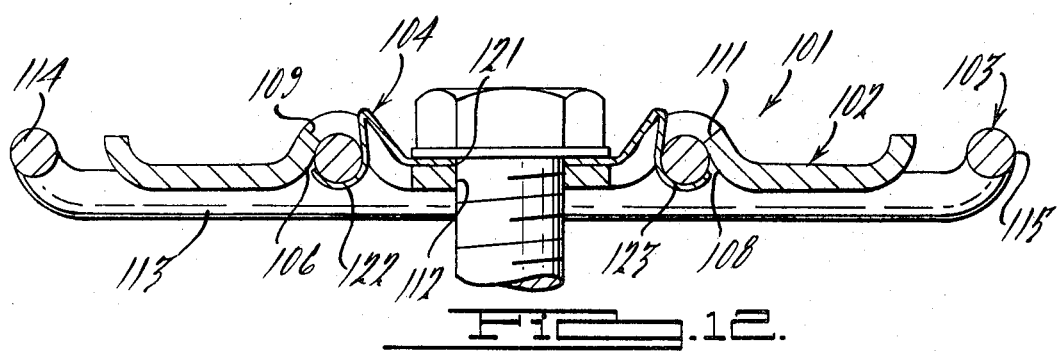

HOLD-DOWN ASSEMBLY FOR SLIDING CALIPER TYPE DISK BRAKE

BACKGROUND OF THE INVENTION

This invention relates to a sliding caliper type disk brake assembly and more particularly to an improved caliper hold-down for such a brake.

The construction of the sliding caliper type disk brake is generally well known. With such a brake the caliper has a pair of legs each disposed adjacent a respective braking surface of the rotor. One leg carries an actuating mechanism such as a hydraulic piston that operates a first brake pad. The caliper is supported for sliding movement and a second brake pad is affixed to the other caliper leg. The actuating mechanism, when operated, creates a reactive force that slides the caliper and brings the second brake pad into engagement with the associated rotor braking surface. Because of its simplicity, this type of brake currently enjoys wide commercial use.

The supporting arrangement for permitting sliding movement of the caliper should be sufficiently accurate so as to restrain the movement of the caliper in a purely axial direction. This must be done, however, consistently with maintaining a reasonable cost for the assembly. Furthermore, the support should permit convenient disassembly for pad replacement. Since some clearances are inherently necessary, it has been proposed to use a resilient member for holding the caliper against vibratory movement. The springs previously proposed for this purpose have been subject to failures, particularly caused by corrosion of highly stressed areas of the spring. Furthermore, although the spring should provide sufficient force to prevent vibration or rattling, it must not interfere with the sliding movement of the caliper.

It is, therefore, a principal object of this invention to provide an improved resilient hold-down arrangement for a sliding caliper type disk brake.

It is a further object of the invention to provide a sliding caliper hold-down spring that effectively prevents vibration without interfering with the sliding movement of the caliper.

It is another object of the invention to provide an improved hold-down arrangement for a sliding caliper disk brake that will withstand corrosion and fatigue without failure.

SUMMARY OF THE INVENTION

This invention is adapted to be embodied in a sliding caliper type disk brake assembly that includes a supporting member adapted to be affixed against rotation relative to the associated brake rotor and a caliper member. Guide means on the supporting member and on the caliper member support the caliper member for sliding movement in a direction substantially parallel to the axis of rotation of the associated rotor. Brake pad means are associated with the caliper member and actuating means carried by the caliper member slide the caliper member along the guide means and actuate the brake pad means into engagement with the associated rotor. Resilient hold-down means are employed for maintaining the guide means in contact. The hold-down means comprises a plate adapted to be affixed relative to one of the members and a formed spring having a first portion retainingly engaged with the plate and a second portion slidably engaged with the other of the members. The first and second portions of the formed spring are resiliently deflectable relative to each other for exerting a resilient restraining force on the guide surfaces.

BRIEF DESCRIPTION OF THE DRAWINGS

FIG. 5 is a top plan view of the hold-down device, with a portion broken away.

FIG. 6 is a cross sectional view taken along the line 6—6 of FIG. 5.

FIG. 7 is a top plan view of a caliper holddown arrangement incorporating a second embodiment of the invention.

FIG. 8 is an enlarged side elevational view of the embodiment shown in FIG. 7.

FIG. 9 is a cross sectional view taken along the line 9—9 of FIG. 8.

FIG. 10 is a top plan view, with portions broken away, of a hold-down arrangement for sliding caliper disk brakes incorporating a third embodiment of the invention.

FIG. 11 is a cross sectional view taken along the line 11—11 of FIG. 10.

FIG. 12 is a cross sectional view taken along the line 12—12 of FIG. 11.

DETAILED DESCRIPTION OF THE PREFERRED EMBODIMENTS

Figure 1:
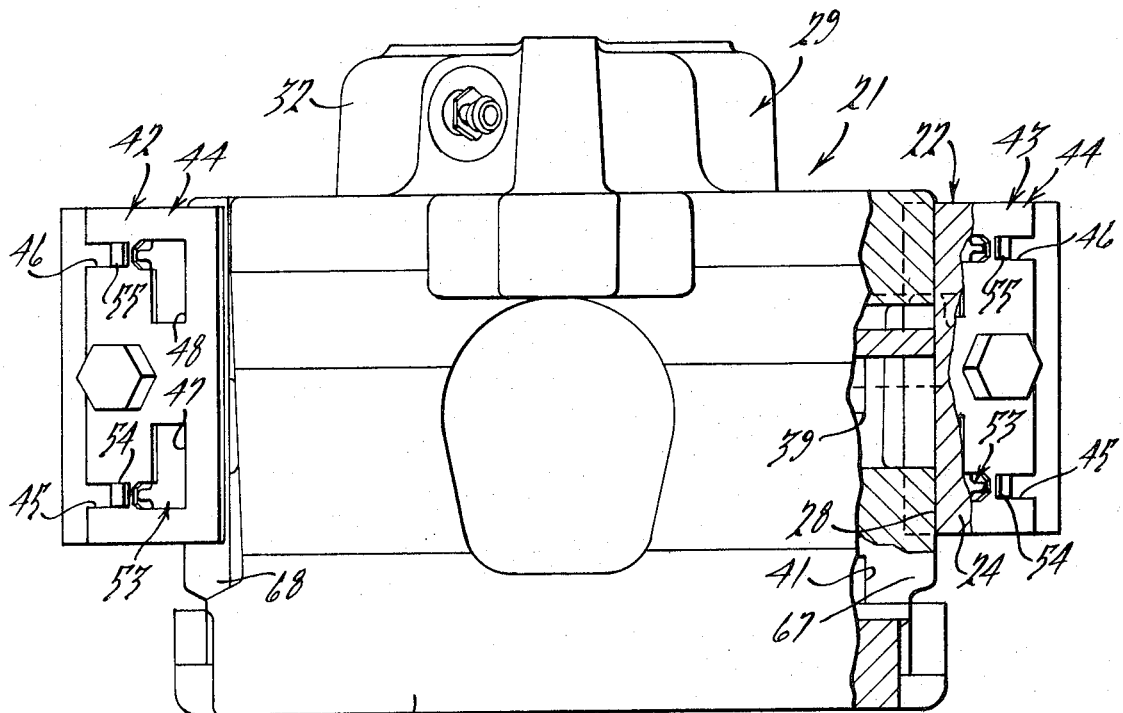
FIG. 1 is a top plan view, with a portion broken away, of a disk brake assembly incorporating a first embodiment of the invention.
Figure 2:
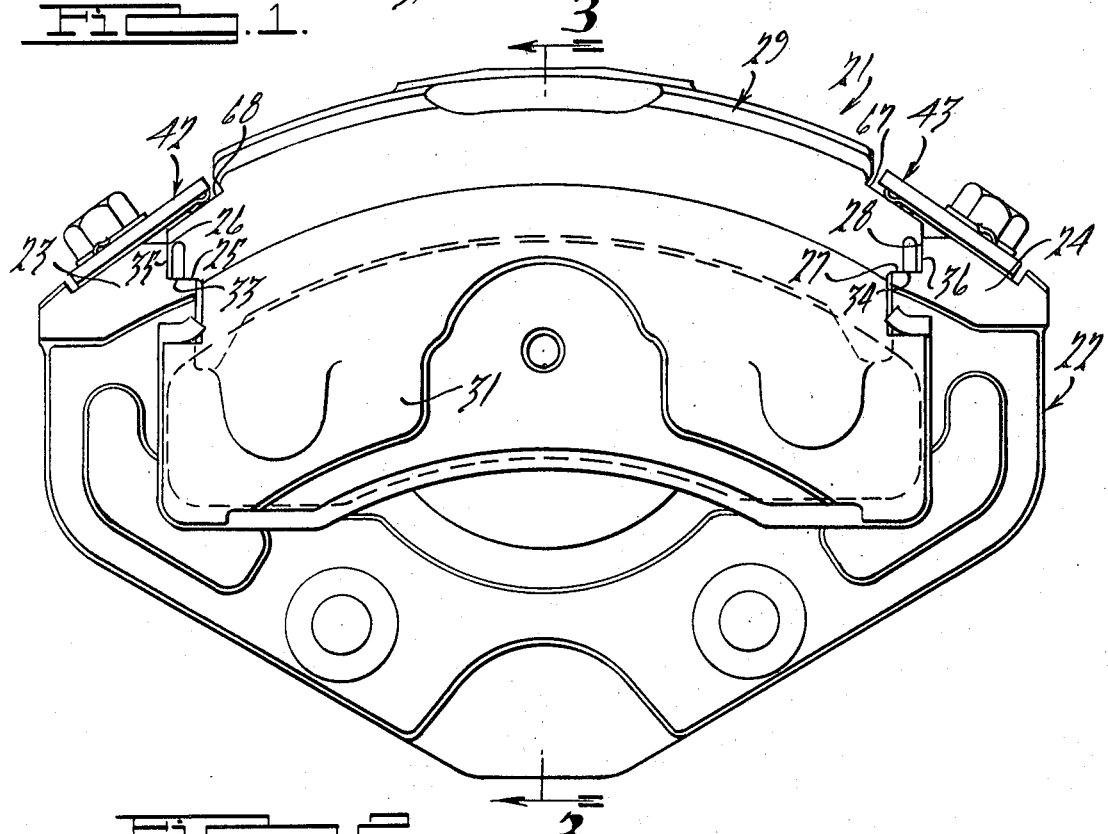
FIG. 2 is an end elevational view of the brakes shown in FIG. 1.
Figure 3:
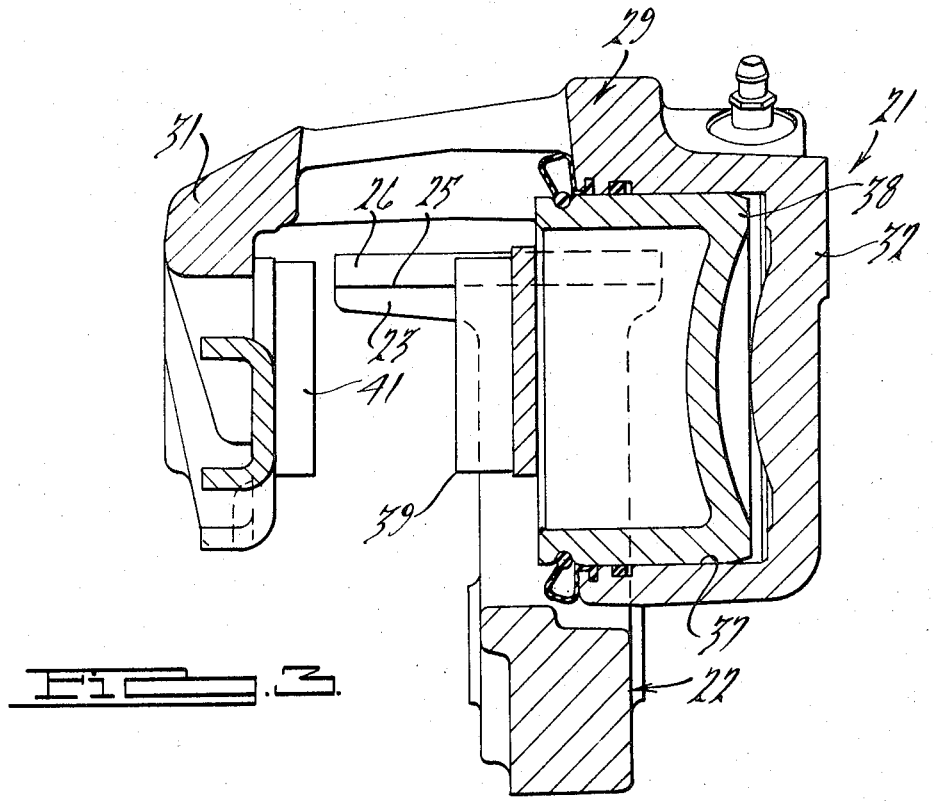
FIG. 3 is a cross sectional view taken along the line 3—3 of the brake shown in FIG. 2.
Figure 4:
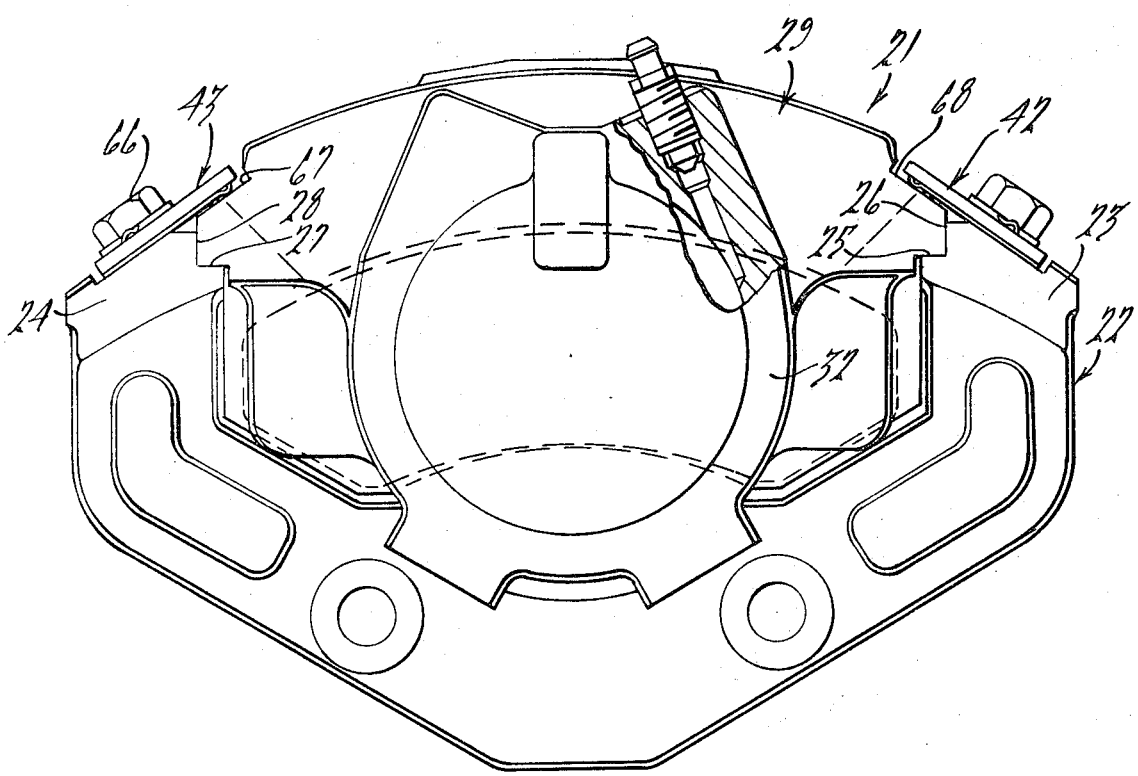
FIG. 4 is an end elevational view of the end opposite that shown in FIG. 2.

Embodiment of FIGS. 1 through 6

A disk brake assembly incorporating a first embodiment of the invention is identified generally by the reference numeral 21. The disk brake assembly 21 is comprised of a torque taking member or torque plate 22 that is adapted to the affixed against rotation relative to any suitable component of the associated motor vehicle and juxtaposed to the brake rotor (not shown). The torque plate 22 has a main portion that is adapted to lie on one side of the rotor and a pair of circumferentially spaced arms 23 and 24 that extend in part acorss the outer periphery of the rotor. The arms 23 and 24 are grooved to provide guide surfaces that are defined by right angled faces 25, 26 and 27,28 respectively.

A caliper 29 is positioned relative to the torque plate 22 and has leg portions 31 and 32 that are juxtaposed to th oppositely facing braking surfaces of the rotor. The caliper 29 has surfaces 33 and 34 that are slidably supported upon the torque plate surfaces 25 and 27, as will become more apparent as this description proceeds. In addition, oppositely facing surfaces 35 and 36 of the caliper are embraced by the torque plate surfaces 26 and 28.

The caliper leg 32 defines a cylinder bore 37 in which a piston 38 is slidably supported. The cylinder bore 37 is adapted to be pressurized from a master cylinder (not shown) as is well known in this art. This pressurization causes the piston 38 to slide in the cylinder bore 37 and actuate a brake pad 39 that is interposed between the piston 38 and one of the rotor braking surfaces. As is well known with this sliding caliper type of disk brake, the pressurization of the bore 37 creates a reactive force that slides the caliper 29 in a direction parallel to the axis of rotation of the associated rotor. The leg 31 applies pressure to a second brake pad 41 that is interposed between this caliper leg and the other rotor braking surface. The brake pad 39 is, therefore, directly actuated and the brake pad 41 is actuated by a reactive force on the caliper 29.

The surfaces 25, 26 and 27, 28 of the torque plate arms 23 and 24, as has been noted, support the caliper 29 for its sliding movement. In addition, this support precludes rotation of the caliper 29 upon engagement of the brake pad 41 with the rotor. Thus, the torque plate 22 takes the braking torque from the brake pad 41 via the caliper 29. In addition, the brake pad 39 has a pair of offset ears that are slidably supported on the torque plate arms 23 and 24.

It will be noted that the structure thus far described includes no structure for precluding movement of the caliper 29 in a radially outward direction. Holddown assemblies, indicated generally by the reference numerals 42 and 43 are employed for restraining movement in a radially outward direction. These hold-down assemblies apply a resilient bias to the caliper 29 to resist this movement while permitting relatively free sliding movement of the caliper 29 in the axial direction.

Since each of the hold-down assemblies 42 and 43 is identical in construction only one will be described in detail. The hold-down assemblies are comprised of a formed plate 44. The plate 44 has a pair of notches 45 and 46 that extend toward its center from one of its circumferential outer edges. Adjacent the inner terminus of the notches 45 and 46 the plate is formed with two generally rectangularly shaped openings 47 and 48. The openings 47 and 48 include notched out portions 49 and 51 that extend toward the notches 45 and 46 respectively. The plate 44 is also formed with a central aperture 52.

In addition to the plate 44, each hold-down assembly includes a formed spring, indicated generally by the reference numeral 53. The spring 53 is formed from spring stock or the like and has a configuration that is somewhat complementary to the configuration of the plate 44. The spring 53, however, has a pair of reversely bent tabs 54 and 55 that are received in the plate notches 45 and 46, respectively. These portions serve to hold the spring 53 to the plate 44. Outstruck tangs 56 and 57 extend from one side of the plate 44 into the notches 49 and 51. The tangs 56 and 57 and tabls 54 and 55 cooperate with the plate 44 to lock these elements together.

The spring 53 has a pair of spaced cantilevered portions 58 and 59 that have rounded peripheral edges 61 and 62. Between the cantilevered portions 58 and 59 a somewhat thrust cantilevered portion 63 is formed with a rounded peripheral edge 64.

The spring 53 is formed with a central aperture 65 that is aligned with the plate aperture 52. The apertures 52 and 65 pass bolts 66 that are tapped into threaded holes in the respective torque plate arms 23 and 24 to affix the retaining members 42 and 43 to the torque plate 22. When so assembled the cantilvered arms 58 and 59 engage machined upper surfaces 67 and 68 of the caliper 29 and exert a resilient downward bias on the caliper. In addition, the cantilevered portions 63 and particularly its arcuate end 64 engages the backing plate of the brake pad 39 to hold it in engagement with the guide surfaces of the torque plate arms 23 and 24.

It should be noted that the cantilevered arms 58, 59 and 63 and particularly their curved end portions 61, 62 and 64, respectively, engage the sliding components of the brake, specifically the caliper 29 and brake pad 35 to hold these components against movement in a radially outward direction. The arrangement is such, however, that the spring does not interfere with the sliding movement of these components during brake actuation.

Embodiment of FIGS. 7 through 9

Although the leaf type spring, as in the preceding described embodiment, has certain advantages, this type of spring is more prone to failure under stress conditions, particularly where the spring is exposed to corrosion, such as is true in a disk brake assembly. The embodiment now to be described includes a formed wire spring that is loaded torsionally. The hold-down assembly is identified generally by the reference numeral 71. Since the brake with which the hold-down assembly 71 is intended for use is the same as that previously described, the caliper, torque plate and related components have not been illustrated and will not be described.

The hold-down assembly 71 is comprised of a plate, indicated generally by the reference numeral 72 and a formed wire spring, indicated generally by the reference numeral 73. The plate 72 is formed with a recess 76 that extends from one side to the other in a direction generally parallel to the axis of rotation of the associated rotor. The recess 76 is intersected at its central portion by a recess 77 so that the recesses 76 and 77 generally form a T-shape. In the area nested by these recesses the plate 72 is formed with a pair of apertures 78 and 79 that are adapted to pass bolts or other fastening devices for securing the hold-down assembly 71 to the torque plate.

The spring 73 has a generally straight portion 81 that extends parallel to the axis of rotation of the rotor and which is slidably engaged with a machined surface of the caliper. A pair of arcuate curved portions 82 and 83 extend from the opposite ends of the portion 81 toward the plate groove 76. The arcuate portions 82 and 83 terminate in straight portions 84 and 85 that extend from opposite ends into the plate groove 76. Straight portions 86 and 87 extend at right angles from the ends of the portions 84 and 85 and lie nested to each other in the plate groove 77. The inner ends of the portions 86 and 87 are retained in the groove 76 by means of unturned tabs 88 and 89 formed integrally with the plate 72 (FIG. 9).

FIG. 8 shows the retainer assembly before it has been attached to the brake. When the plate 72 is affixed to the torque plate by the bolts that pass through the apertures 78 and 79 the formed spring portion 81 will engage the caliper. The portions 84 and 85 will deflect torsionally and exert a resilient bias through the portions 82 and 83 to the portion 81 which, in turn, resiliently bears against the caliper. Due to the round shape of the portion 81 the spring will have only line contact with the caliper and thus will offer only slight resistance to the sliding movement of the caliper.

The embodiment of FIGS. 10 through 12

In the preceding embodiment the formed wire spring did not resiliently engage the brake pad that moved axially relative to the caliper. If desired, the portion 81 of the spring could be formed with an offset so as to engage one of the brake pads. There are certain advantages, however, to providing a separate spring for holding the brake pad. The embodiment of FIGS. 10 through 12 is of this type.

This embodiment of hold-down is identified generally by the reference numeral 101. As with the embodiment of FIGS. 7 through 9 the cooperating brake structure will not be described since it is the same as that of the embodiment shown in FIGS. 1 through 6. The retainer assembly 101 includes a plate, indicated generally by the reference numeral 102, a formed wire spring, indicated generally by the reference numeral 103 and a combined spring keeper and formed leaf spring, indicated generally by the reference numeral 104.

The plate 102 has a generally planar shape and is formed with a pair of right angled grooves comprised of portions 105, 106 and 107, 108, respectively. Adjacent the midpoint of the groove portions 106 and 108 the plate is formed with generally rectangularly shaped openings 109 and 111. A circular aperture 112 is formed between the openings 109 and 111.

The formed wire spring 103 has a generally straight portion 113 that extends generally parallel to the axis of rotation of the associated brake rotor. Portions 114 and 115 extend at generally right angles from the opposite ends of the portion 113 and terminate adjacent the plate groove portions 105 and 107. Straight portions 116 and 117 extend toward each other at generally right angles from the terminal ends of the portions 114 and 115 and extend into the plate groove portions 105 and 107. At the inner ends of the spring portions 116 and 117 right angled portions 118 and 119 extend and lie within the groove portions 106 and 108.

The retainer member 104 has a generally flat portion that is formed with an aperture 121 that is aligned with the plate aperture 112 and which passes a bolt or like fastener for securing the hold-down assembly 101 relative to the torque plate. From opposite sides of this portion of the retainer 104 tabs 122 and 123 extend and pass through the plate openings 109 and 111, respectively. The tab portions 122 and 123 engage the wire spring portions 118 and 119 and retain the formed spring 103 relative to the plate 102.

The retainer member 104 also has a portion 124 (FIG. 11) that extends forwardly toward the formed wire spring portion 113, and terminates just slightly inwardly of it. A portion 125 extends at a right angle from the portion 124 downwardly and terminates in a reversely bent portion 126.

When the retainer member 101 is fastened to the torque plate the formed wire spring portion 113 will engage the caliper and torsionally load the spring portions 116 and 117 to provide a resilient holding force on the caliper as in the previously described embodiment. The portion 126 of the retainer member 104 will engage the brake pad that is movable relative to the caliper and cause resilient deflection of the portion 124. Thus, the brake pad will also be held against rattling.

It is to be understood that the foregoing description is that of preferred embodiments of the invention. Various changes and modifications may be made without departing from the spirit and scope of the invention as defined by the appended claims.

I claim:

1. A hold-down assembly for holding the caliper of a sliding caliper type disk brake assembly comprising a generally rectangular shaped plate, said plate being formed with at least one notch extending inwardly from one of its peripheral edges and a rectangular opening formed adjacent said notch, and a spring, said spring having a first tab extending through said notch and interlocked with said plate, a second tab extending through said rectangular opening and interengaged with said plate, said tabs facing each other and being effective to retain said spring relative to said plate, and a cantilevered portion extending away from said plate, said cantilevered portion terminating in an arcuate end adapted to engage the caliper.

2. A hold-down assembly for a sliding caliper type of disk brake comprising a formed plate, said plate being formed with a generally T-shaped groove therein, and a formed wire spring, said wire spring having a first portion adapted to engage the caliper, said first portion being spaced from said plate and terminating at its opposite ends in second and third portions that extend toward said plate, said second and said third portions terminating adjacent the cross leg of said T-shaped groove in said plate and having joined thereto respective fourth and fifth portions extending into said cross leg, and sixth and seventh portions extending from the ends of said fourth and fifth portions, respectively, and into the remaining part of said T-shaped groove, said plate being formed with tabs interlocked with said sixth and seventh portions of said spring for retaining said spring to said plate for torsional deflection of said fourth and fifth portions of said spring upon movement of said first portion relative to said plate.

3. A hold-down assembly for a sliding caliper type of disk brake comprising a formed plate; said plate being formed with a pair of right angled grooves therein, a formed wire spring; said wire spring having a first portion adapted to engage the caliper, said first portion being spaced from said plate and terminating at its opposite ends in second and third portions that extend toward said plate, said second and said third portions terminating adjacent respective legs of said grooves in said plate and having joined thereto respective fourth and fifth portions extending into the respective legs, and sixth and seventh portions extending from the ends of said fourth and fifth portion, respectively, and into the remaining legs of said grooves, said plate being formed with openings adjacent said sixth and seventh portions of said spring; and a combined leaf spring and keeper juxtaposed to the side of said plate opposite to said wire spring and said grooves, said combined leaf spring and keeper having a pair of tabs extending through respective of said plate openings and interlocked with said sixth and said seventh portions of said spring for retaining said spring to said plate for torsional deflection of said fourth and fifth portions of said spring upon movement of said first portion relative to said plate, said combined leaf spring and keeper having a part extending toward the first portion of said wire spring and terminating short thereof in a reversely bent portion, said reversely bent portion being adapted to engage a brake pad for holding the brake pad against rattling.

4. A sliding caliper type disk brake assembly comprising a supporting member adapted to be affixed against rotation relative to an associated brake rotor, a caliper member, guide means on said supporting member and on said caliper member for supporting caliper member for sliding movement in a direction substantially parallel to the axis of rotation of the associated rotor, brake pad means associated with said caliper member, actuating means carried by said caliper member for sliding said caliper member along said guide means and for actuating said brake pad means into engagement with the associated rotor, resilient hold-down means for maintaining said guide means in contact, said hold-down means comprising a plate, a formed spring and a leaf spring separate from said formed spring and fixed relative to said plate and inter-engaged with said formed spring for affixing said formed spring to said plate, said leaf spring having a portion adapted to engage said brake pad means for holding said brake pad means against rattling, said formed spring having a portion slidably engaged with one of said members and resiliently deflectable relative to said plate for exerting a resilient force upon said guide surfaces, and means for rigidly affixing said plate to the other of said members.

* * * * *